United States Patent
White

(10) Patent No.: US 9,652,640 B1
(45) Date of Patent: May 16, 2017

(54) CARD LOCKING

(71) Applicant: NCR Corporation, Duluth, GA (US)

(72) Inventor: Joseph Arnold White, Encinitas, CA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 15/054,954

(22) Filed: Feb. 26, 2016

(51) Int. Cl.
*G06K 13/00* (2006.01)
*G06K 7/00* (2006.01)
*G06K 13/08* (2006.01)

(52) U.S. Cl.
CPC ......... *G06K 7/0069* (2013.01); *G06K 13/085* (2013.01)

(58) Field of Classification Search
CPC ...... G06K 7/0021; G06K 13/08; G06K 13/06; G06K 7/084
USPC ................ 235/441, 486, 483, 475
See application file for complete search history.

(56) References Cited

U.S. PATENT DOCUMENTS 6,254,005 B1 * 7/2001 Smith .................... G06K 13/08
235/475

* cited by examiner

*Primary Examiner* — Karl D Frech
(74) *Attorney, Agent, or Firm* — Schwegman, Lundberg & Woessner

(57) ABSTRACT

A chip-enabled card is detected within a card reader. The card reader locks the chip-enabled card in the card reader until an indication is received indicating that a card transaction with the chip-enabled card has ended and preventing the chip-enabled card from being removed while the chip-enabled card is locked in the card reader.

18 Claims, 5 Drawing Sheets

CARD LOCKING

BACKGROUND

Credit card theft is a major concern worldwide. Typically, a consumer is protected from theft as is the bank that issues a credit card. That is, when illegal use of a credit card is confirmed after an investigation by the bank, the consumer's account is credited for the amount of theft. However, the bank typically debits the account of a retailer that performed the illegal transaction.

To thwart illegal credit card use, banks have started to roll out dual chip-magnetic strip cards, such cards have been deployed in Europe for several years now and are in the processes of being fully deployed to United State (U.S.) based consumers.

The magnetic card readers that read chip-enabled cards are problematic to the U.S. consumer and U.S. retailer. Typically, legacy card readers that were supposed to be used for magnetic strip reading have been upgraded to read the embedded chip. The device or host device (Self-Service Terminal (SST)) interfaces were also upgraded to instruct consumers to leave the card in the card reader for the duration of the transaction (until canceled by the consumer, approved and completed, or denied by the bank).

The embedded chip on the card has to stay in the card reader for the entirety of the transaction because the reader includes a card-specific embedded key (which may be randomly updated during a transaction with a new key by the bank during the transaction). The key is used to encrypt the transaction on a unique transaction basis. This takes more processing time and therefore the card and its embedded chip have to remain in the card reader for the duration of a given transaction.

Unfortunately, this is problematic in the U.S. and for the U.S. consumer. The upgraded card readers do not physically lock the card in place during the transaction and the U.S. consumer is condition to insert and remove their cards quickly and often ignore the new interface warnings.

This is problematic for retailers for a variety of reasons. First, even for a failed transaction the banks charge the retailer a small transaction fee, which for a large retailer can add up to a significant amount of fees (especially given the frequency of failed transactions). Second, during high consumer traffic times, failed transactions delay transaction throughput at both cashier-assisted Point-Of-Sale (POS) terminals and at SSTs. So, the problem has fairly significant ramifications for retailers.

SUMMARY

In various embodiments, methods and a card reader for chip embedded card reader locking are presented.

According to an embodiment, a method for card reader locking is provided. Specifically, in an embodiment, a chip-enabled card is detected as being inserted into a card reader. Next, the chip-enabled card is locked in the card reader until a transaction with the chip-enabled card ends.

DETAILED DESCRIPTION

Figure 1A:
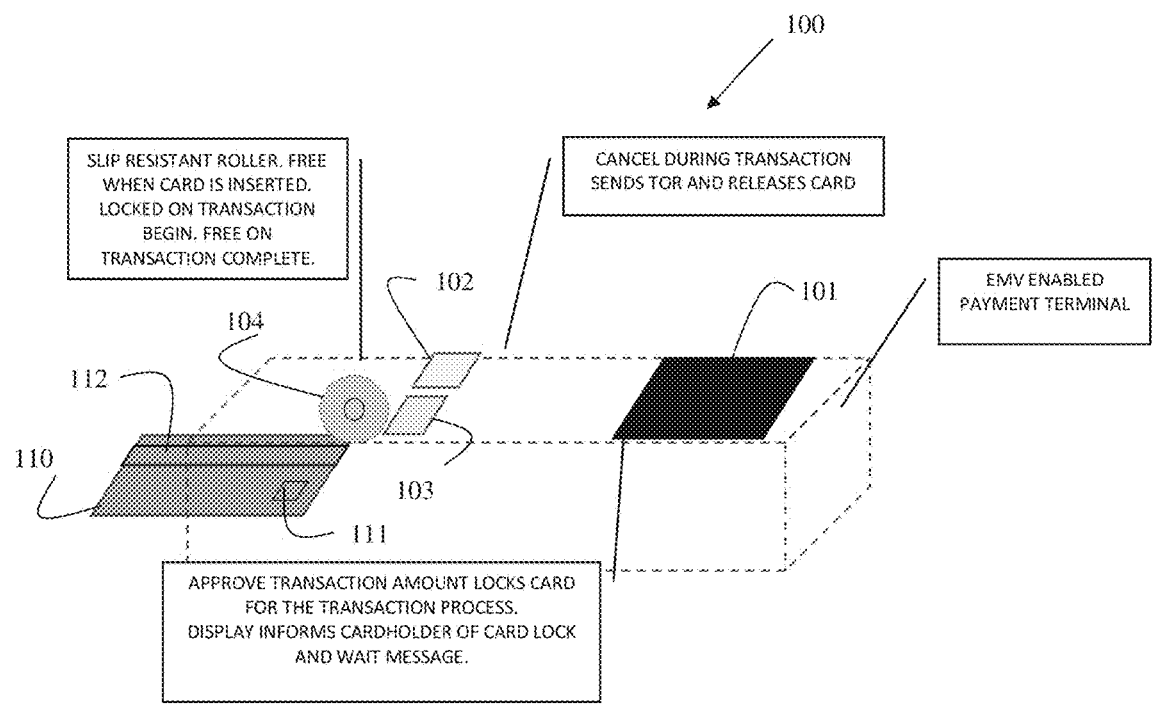
FIG. 1A is a diagram of a card reader, according to an example embodiment.

FIG. 1A is a diagram of a card reader 100, according to an example embodiment. The card reader 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the card reader locking presented herein and below.

Moreover, various components are illustrated as one or more software modules, which residing in non-transitory storage and/or hardware memory as executable instructions that when executed by one or more hardware processors perform the processing discussed herein and below.

The techniques, methods, and systems presented herein and below for card reader locking can be implemented in all, or some combination of the components shown in different hardware computing devices having one or more hardware processors.

The card reader 100 includes a display 101, one or more interfaces buttons (102 and 103), and at least one internal roller mechanism 104. The card reader 100 processes chip-enabled credit/debit cards 110 having an embedded chip 111, and a magnetic strip 112.

It is noted that the layout of the card reader 100 can be in a variety of different permutations. For example, the display 101 can be a touchscreen, the interface buttons 102 and 103 can be associated with dynamically changes options from the interface of the card reader 100 and situated adjacent to the display 101. It may also be that the card reader 100 is integrated into a Self-Service Terminal (SST) and uses the touchscreen interface of the SST and/or the keyboard of the SST. It may be also that the card reader is integrated into a Point-Of-Sale (POS) terminal.

Moreover, there can be more than two hard interface buttons 102 and 103 on the standalone card reader 100. Two buttons 102 and 103 are just illustrated to show a confirm amount button 102 and a cancel button 103; but it is noted that this can done in a variety of manners and the buttons 102 and 103 can, in some configurations, be entirely touchscreen based, such that there is no physical buttons on the card reader 100 and are present in a touchscreen of the display 101 (or any of the other possible configurations for the standalone card reader 100).

During a transaction, a customer inserts his/her card 110 into the card reader 100 in an orientation dictated by instructions posted on or near the card reader 100 or by instructions illustrated in an interface presentation presented on the display 100. Therefore, the illustration on the orientation of the card 110 inserted into the card reader 100 can vary depending on the configuration of the card reader 100 and the exact orientation in the FIG. 1A is one or many possible orientations.

The roller mechanism 104 includes a roller and is illustrated in a manner for visibility and comprehension as it is apparent that the roller mechanism 104 is not visible to the consumer and is internal to the card reader 104.

The roller mechanism 104 is also interfaced to one or more electromechanical components controlled by electronic circuitry interfaced to a motherboard having at least one hardware processor that receives sensor and signal readings from the electromechanical components and permit the hardware processor responsive to the readings to control and operate the roller mechanism 104.

During operation of the card reader 100, when a consumer inserts his/her card 110 into the card reader 100 in a designated and proper orientation, sensors indicate to the hardware processor when the card 110 is fully and properly inserted into the card reader 100 for proper reading and processing during a transaction. At this point, the hardware processor locks the roller of the roller mechanism 104, which prevents the card 110 from being manually removed by the consumer until the transaction ends (canceled by the customer through cancel button 103, completed as indicated by the terminal to which the card reader 100 is interfaced (SST or POS terminal), or denied as a form of payment for a transaction by the terminal. Once the transaction ends, the hardware processor receives that indication from either the terminal, interface, or the reader 100 and the hard processor causes the roller mechanism 104 to unlock permitting the consumer to freely remove the card 110.

In an embodiment, the roller of the roller mechanism 104 is a slip resistant roller.

In an embodiment, the motherboard and hardware processor reside within the card reader 100.

In an embodiment, the motherboard and hardware processor reside external to the card reader 100 and connected to an electronic circuit board, where the motherboard controls other devices. In this embodiment, the card reader 100 is integrated into another device, such as an SST or POS terminal.

The FIG. 1A also includes some descriptive material relevant to a card transaction, such as an indication that the card reader 100 is EMV enabled. EMV stands for Europay MasterCard® and Visa® and is a transaction processing mechanism that uses card embedded chips to unique encrypt each transaction and validate the transaction.

In an embodiment, the card reader 100 is integrated into an SST. In an embodiment, the SST is an Automated Teller Machine (ATM). In an embodiment, the SST is a kiosk.

In an embodiment, the card reader 100 is integrated into a POS terminal.

Figure 1B:
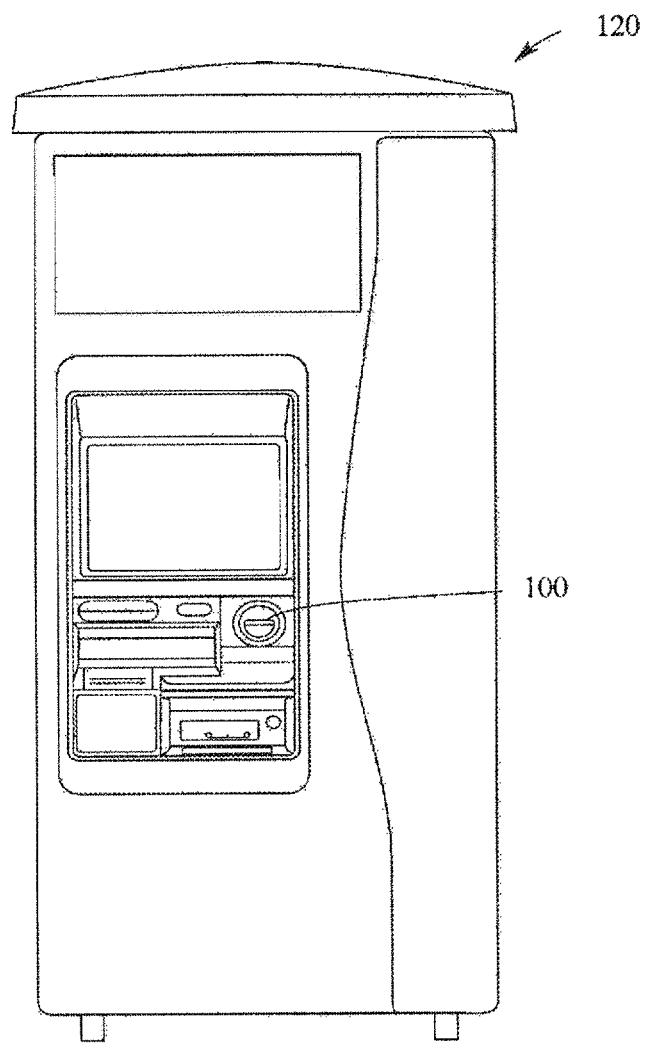
FIG. 1B is a diagram a Self-Service Terminal (SST) having an integrated card reader, according to an example embodiment.

FIG. 1B is a diagram a SST 130 having an integrated card reader 100, according to an example embodiment.

FIG. 1B is shown to illustrate that the card reader 100 can be integrated into the SST 130 (non-standalone card reader 100 embodiment).

The card reader 100 detects an inserted card 110 having an embedded chip 111 fully inserted into the card reader 100 and locks the roller mechanism 104 until the transaction ends (as defined above) at which point the card reader 100 unlocks the roller mechanism 104 for the card 110 to be removed from the card reader 100.

In an embodiment, the software (executable instructions) and the hardware processor that receive the readings for the hardware processor to make a determination as to when to lock the roller mechanism 104 and when to unlock the roller mechanism 104 are contained within the integrated card reader 100 as an independent peripheral device of the SST 120.

In an embodiment, the software (executable instructions) and the hardware processor that receive the readings for the hardware processor to make the determination as to when to lock the roller mechanism 104 and when to unlock the roller mechanism 104 are external to the card reader 100 and connected to an electronic circuit board within the SST.

These and other embodiments are now discussed with reference to the FIGS. 2-4.

Figure 2:
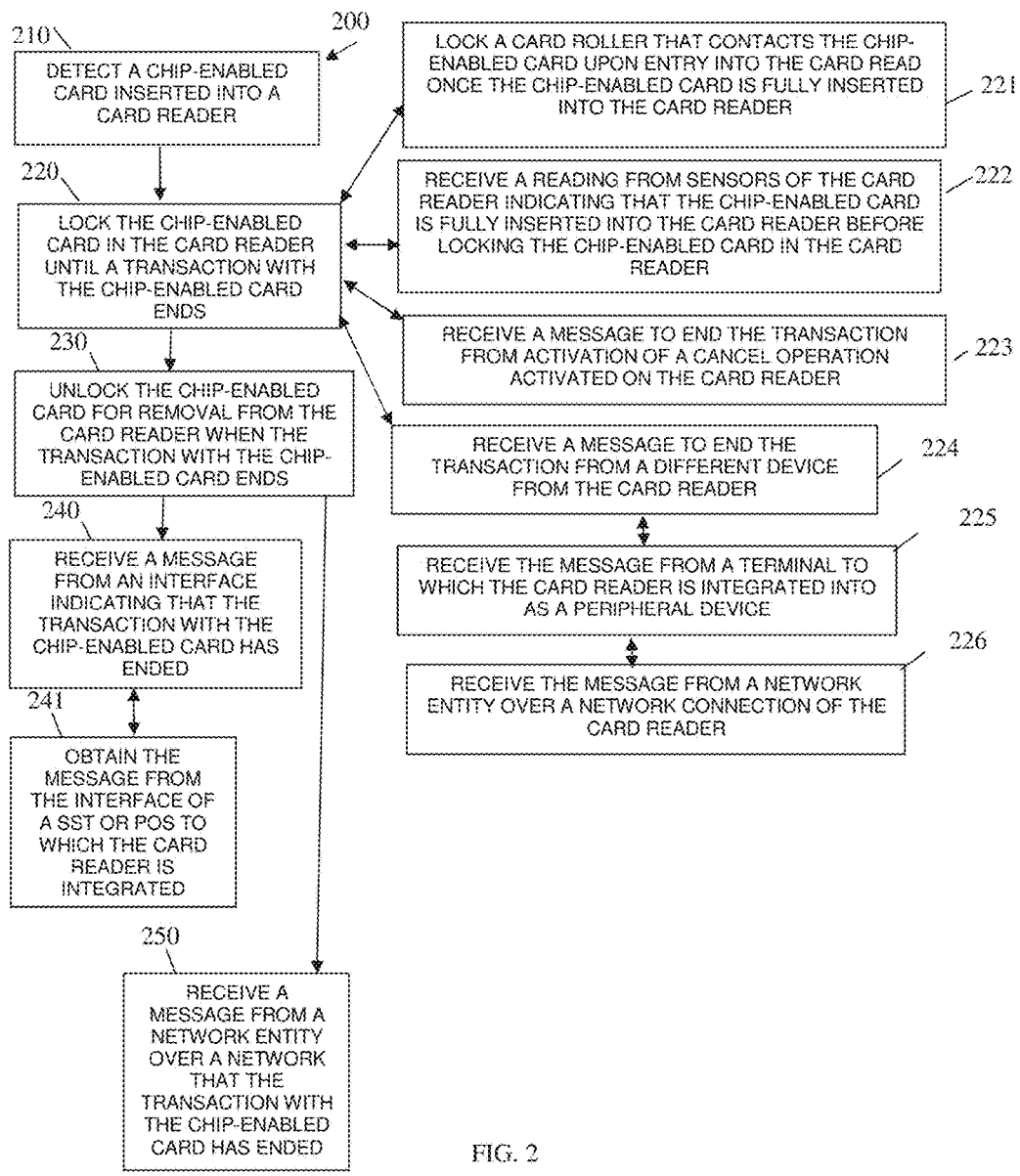
FIG. 2 is a diagram of a method for card reader locking and unlocking, according to an example embodiment.

FIG. 2 is a diagram of a method 200 for card reader locking and unlocking, according to an example embodiment. The software module(s) that implements the method 200 is referred to as a "card controller." The card controller is implemented as executable instructions programmed and residing within memory and/or a non-transitory computer-readable (processor-readable) storage medium and executed by one or more hardware processors of a hardware computing device. The processors of the device that executes the card controller are specifically configured and programmed to process for controlling one or more electromechanical components of a card reader. The card controller may or may not have access to one or more networks during its processing. Any such networks can be wired, wireless, or a combination of wired and wireless.

In an embodiment, the device that executes the card controller is the card reader 100. In an embodiment of this embodiment, the card reader 100 is an independent stand-alone computing device interfaced to a terminal. In another embodiment of this embodiment, the card reader 100 is an independent integrated peripheral devices integrated into one of: an SST (such as SST 120) and a FOS terminal.

In an embodiment, the device that executes the card controller is a SST (such as SST 120) to which the card reader 100 is integrated.

In an embodiment, the device that executes the card controller is a POS terminal to which the card reader 100 is integrated.

At 210, the card controller detects a chip-enabled card inserted into a card reader. This can be done through a variety of manners through sensors within the card reader to messages from other devices or interfaces to which the card reader is interfaced to (some of which were discussed above with the FIGS. 1A-1B and some discussed below with reference to the FIG. 3.

At 220, the card controller locks the chip-enabled card in the card reader until a transaction with the chip-enabled card ends. The indication that the card needs locked and is fully inserted into the card reader can occur in a variety of manners.

For example, at 221, the card controller locks a card roller that contacts the chip-enabled card upon entry into the card reader once the chip-enabled card is fully inserted into the card reader.

According to another case, at 222, the card controller receives a reading from one or more sensors of the card reader indicating that the chip-enabled card is fully inserted into the card reader before locking the chip-enabled card in the card reader.

In an embodiment, at 223, the card controller receives a message to end the transaction from activation of a cancel operation activated on the card reader (such as the cancel button 102 or through other soft or hard interface buttons as discussed above with the FIG. 1A).

In an embodiment, at 224, the card controller receives a message to end the transaction from a different device from the card reader.

For example, and in an embodiment of 224, at 225, the card controller receives the message from a terminal to which the card reader is integrated into as a peripheral device.

In an embodiment of 225 and at 226, the card controller receives the message from a network entity over a network connection of the card reader. In an embodiment, the network entity is the transaction authorizing entity (such as an EMV process or a bank implemented the EMV process).

According to an embodiment, at 230, the card controller unlocks the chip-enabled card for removal from the card reader when the transaction with the chip-enabled card ends.

In an embodiment of 230 and at 240, the card controller receives a message from an interface indicating that the transaction with the chip-enabled card has ended.

In an embodiment of 240 and at 241, the card controller obtains the message from the interface of an SST or a POS terminal to which the card reader is integrated or a part of.

In an embodiment of 230 and at 250, the card controller receives a message from a network entity over a network that the transaction with the chip-enabled card has ended. In an embodiment, the network entity is an EMV process or a bank implementing the EMV process.

Figure 3:
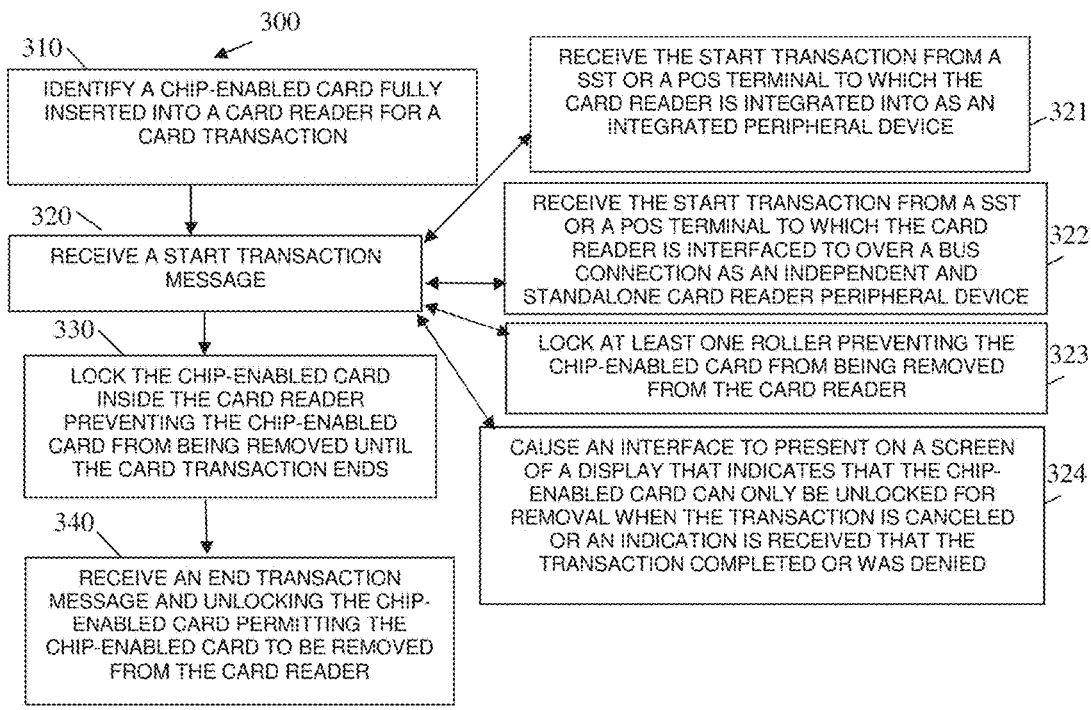
FIG. 3 is a diagram of another method for card reader locking and unlocking, according to an example embodiment.

FIG. 3 is a diagram of another method for card reader locking and unlocking, according to an example embodiment. The software module(s) that implements the method 300 is referred to as a "card lock manager." The card lock manager is implemented as executable instructions programmed and residing within memory and/or a non-transitory computer-readable (processor-readable) storage medium and executed by one or more hardware processors of a hardware device. The processors of the device that executes the card lock manager are specifically configured and programmed to process the authentication service. The card lock manager may or may not have access to one or more networks during its processing. Any such networks can be wired, wireless, or a combination of wired and wireless.

In an embodiment, the device that executes the card lock manager is the card reader 100. In an embodiment of this embodiment, the card reader 100 is an independent stand-alone device interfaced to a terminal (SST 120 or POS terminal). In another embodiment of this embodiment, the card reader 100 is integrated as a peripheral device within the SST 120 or a POS terminal.

In an embodiment, the card lock manager implements the processing discussed above in any of the FIGS. 1A-1B and 2.

At 310, the card lock manager identifies a chip-enabled card fully inserted into a card reader for a card transaction.

At 320, the card lock manager receives a start transaction message. This can occur in a variety of manners depending upon how the card reader is configured.

For example, at 321, the card lock manager receives the start transaction from an SST or a POS terminal to which the card reader is integrated into as an integrated peripheral device.

In another case, at 322, the card lock manager receives the start transaction from an SST or a POS terminal to which the card reader is interfaced to over a bus connection as an independent and standalone card reader peripheral device.

In an embodiment, the card lock manager locks at least one roller preventing the chip-enabled card from being removed from the card reader.

In an embodiment, at 324, the card lock manager causes an interface to present on a screen of a display an indication that the chip-enabled card can only be unlocked from removal when the transaction is canceled or an indication is received that the transaction completed or was denied.

At 330, the card lock manager lock the chip-enabled card inside the card reader preventing the chip-enabled card from being removed until the card transaction ends.

According to an embodiment, at 340, the card lock manager receives an end transaction message and unlocks the chip-enabled card permitting the chip-enabled card to be removed from the card reader.

Figure 4:
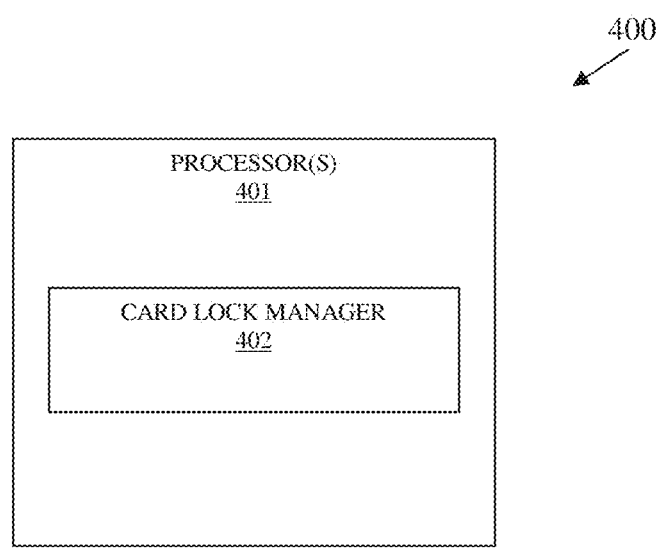
FIG. 4 is a diagram of a card reader, according to an example embodiment.

FIG. 4 is a diagram of a card reader 400, according to an example embodiment, according to an example embodiment. The card reader 400 includes a variety of hardware components and software components. The software components of the card reader 400 are programmed and reside within memory and/or a non-transitory computer-readable medium and execute on one or more hardware processors of the card reader 400. The card reader 400 communicates one or more networks, which can be wired, wireless, or a combination of wired and wireless.

In an embodiment, the card reader 400 implements all, any, or some combination of the processing discussed above with the FIGS. 1A-1B and 2-3.

The system 400 includes at least one hardware processor 401 and card lock manager 402.

In an embodiment, the card reader 400 is the card reader 100.

In an embodiment, the card reader 400 is a standalone peripheral device interfaced to the SST 120 or a POS terminal. In an embodiment, the SST is an ATM. In an embodiment, the SST is a kiosk.

In an embodiment, the card reader 400 is integrated into as an integrated peripheral device integrated into the SST 120 or a POS terminal.

The card lock manager 402 is configured to: execute on the hardware processor 401, detect when a chip-enabled card is fully inserted into the card reader 400, and lock the chip-enabled card until an indication is received that a card transaction being performed with the chip-enabled card has ended.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   detecting a chip-enabled card inserted into a card reader; and
   locking the chip-enabled card in the card reader until a transaction with the chip-enabled card ends, wherein locking further includes locking a slip-resistant card roller that contacts the chip-enabled card upon entry into the card reader once the chip-enabled card is fully inserted into the card reader.

2. The method of claim 1 further comprising, unlocking the chip-enabled card for removal from the card reader when the transaction with the chip-enabled card ends.

3. The method of claim 2, wherein unlocking further includes receiving a message from an interface indicating that the transaction with the chip-enabled card has ended.

4. The method of claim 3, wherein receiving further obtaining the message from the interface of a Self-Service Terminal or Point-Of-Sale terminal to which the card reader is integrated.

5. The method of claim 2, wherein unlocking further includes receiving a message from a network entity over a network that the transaction with the chip-enabled card has ended.

6. The method of claim 1, wherein locking further includes receiving a reading from sensors of the card reader indicating that the chip-enabled card is fully inserted into the card reader before locking the chip-enabled card in the card reader.

7. The method of claim 1, wherein locking further includes receiving a message to end the transaction from activation of a cancel operation activated on the card reader.

8. The method of claim 1, wherein locking further includes receiving a message to end the transaction from a different device from the card reader.

9. The method of claim 8, wherein receiving further includes receiving the message from a terminal to which the card reader is integrated into as a peripheral device.

10. The method of claim 8, wherein receiving further includes receiving the message from a network entity over a network connection of the card reader.

11. A method, comprising:
    identifying a chip-enabled card fully inserted into a card reader for a card transaction;
    receiving a start transaction message; and
    locking the chip-enabled card inside the card reader preventing the chip-enabled card from being removed until the card transaction ends, and wherein locking further includes locking at least one slip-resistant card roller preventing the chip-enabled card from being removed from the card reader.

12. The method of claim 11 further comprising, receiving an end transaction message and unlocking the chip-enabled card permitting the chip-enabled card to be removed from the card reader.

13. The method of claim 11, wherein receiving further includes receiving the start transaction from a Self-Service Terminal or a Point-Of-Sale terminal to which the card reader is integrated into as an integrated peripheral device.

14. The method of claim 11, wherein receiving further includes receiving the start transaction from a Self-Service Terminal or a Point-Of-Sale terminal to which the card reader is interfaced to over a bus connection as an independent and standalone card reader peripheral device.

15. The method of claim 11, wherein locking further includes causing an interface to present on a screen of a display that indicates that the chip-enabled card can only be unlocked for removal when the transaction is canceled or an indication is received that the transaction completed or was denied.

16. A card reader, comprising:
    a hardware processor;
    an unlock manager configured to i) execute on the hardware processor, ii) detect when a chip-enabled card is fully inserted into the card reader, and iii) lock the chip-enabled card inside the card reader until an indication is received that a card transaction being performed with the chip-enabled card has ended by locking a slip-resistant card roller.

17. The card reader of claim 16, wherein the card reader is a standalone and independent peripheral device that is interfaced to a Self-Service Terminal (SST) or a Point-Of-Sale terminal.

18. The card reader of claim 17, the SST is one of: an Automated Teller Machine (ATM) and a kiosk.

* * * * *